INVENTOR:
GUSTAV R. GEHRANDT

June 10, 1952  G. R. GEHRANDT  2,599,908
INTERNAL-COMBUSTION ENGINE
Filed March 18, 1946  4 Sheets-Sheet 2

INVENTOR:
GUSTAV R. GEHRANDT

June 10, 1952 G. R. GEHRANDT 2,599,908
INTERNAL-COMBUSTION ENGINE
Filed March 18, 1946 4 Sheets-Sheet 4

INVENTOR.
G. R. Gehrandt

Patented June 10, 1952

2,599,908

UNITED STATES PATENT OFFICE 2,599,908

INTERNAL-COMBUSTION ENGINE

Gustav R. Gehrandt, Evanston, Ill.

Application March 18, 1946, Serial No. 655,218

9 Claims. (Cl. 123—32)

This invention relates in general, to internal combustion engines, but more particularly to the control of the power output of internal combustion engines. The principles involved in this invention are equally adaptable, with only slight variation, to two-cycle and four-cycle engines, to engines of the diesel type, and also to engines taking in a ready mixture of gas and air for combustion, such as blast furnace gas, coke oven gas, producer gas, illuminating gas, and mixtures of air and vapors of carbureted volatile liquid fuels.

This invention also is an elaboration and further development of opposed piston engines, and also of applicant's prior Patent No. 2,129,172 issued September 6, 1938.

In order to successfully increase the power output of an internal combustion engine per piston displacement unit, it is of paramount importance that the amount of fuel, and necessary amount of air for combustion, be reliably controlled. It is furthermore necessary that increases in pressures and temperatures be kept in safe practical limits, in order to successfully safeguard the application of commercially available material.

It is one of the objects of this invention, to provide means whereby all these requirements can be successfully accomplished.

It is another object of the invention to provide a simple method of controlling the pressure of the scavenging and combustion air and thereby control the power output of the engine.

It is a further object of the invention to improve the mechanical, as well as thermal efficiency of the engine, and to simplify the design thereof, reducing the cost of manufacture.

To the attainment of these ends and the accomplishment of other new and useful objects, as will appear, the invention consists in the features of novelty in substantially the construction, combination and arrangement of the several parts hereinafter more fully described and claimed, and shown in the accompanying drawings, illustrating this invention and in which:

Fig. 6 is a cross sectional view through an extension of the combustion chamber of an internal combustion engine, with mechanism to manually vary the volumetric capacity of the combustion chamber of an internal combustion engine.

Fig. 10 is a vertical irregular sectional view on lines 10—10 of Fig. 12, through the cylinder and variable combustion chamber, with injection nozzle, cylinder head and piston arranged for concentrated combustion and turbulence.

Fig. 12 is a horizontal sectional view on line 12—12 of Fig. 10.

Figure 3:
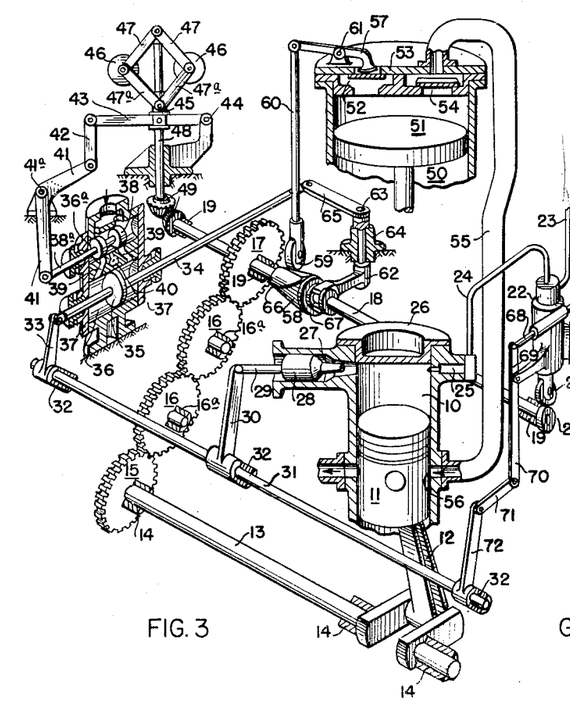
Fig. 3 is an isometric projection of a diagrammatical, general arrangement of the operating and control mechanism to accomplish the objects of this invention.
Figure 4:
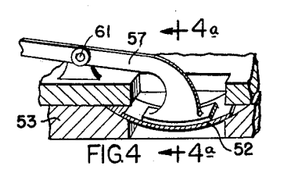
Fig. 4 is an enlarged view partly in section and partly in elevation, of the air inlet valve and control lever, in a position for minimum power output.
Figure 5:
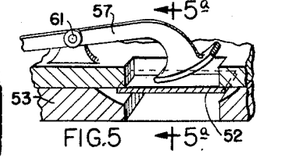
Fig. 5 is an enlarged view partly in section and partly in elevation, of the air inlet valve and control lever, in a position for maximum power output.

For purposes of illustration, parts of a two-cycle diesel engine are shown in Figs. 3–4 and 5, while the apparatus and mechanism shown in Figs. 6–17 may be used for any type of internal combustion engine.

Figure 1:
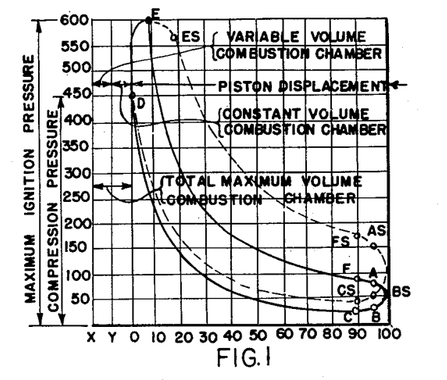
Fig. 1 is an indicator diagram or chart, showing in full lines the operating process of the present day two-cycle internal combustion engine of the diesel type, and in dotted lines the operating process of the same type engine according to the present invention.
Figure 2:
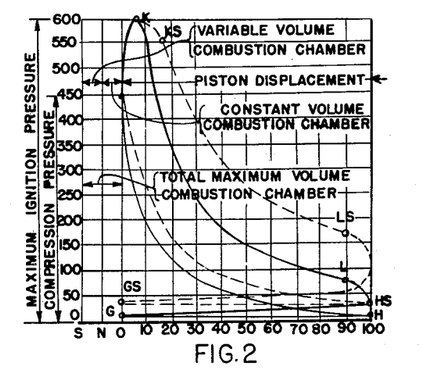
Fig. 2 is an indicator diagram or chart, showing in full lines the operating process of the present day four-cycle internal combustion engine of the diesel type, and in dotted lines the operating process of the same type of engine according to the present invention.

Referring more particularly to the drawings, Figs. 1 and 2 illustrate the underlying basic principles of this improved invention. In an engine according to the present invention, there is provided a combustion chamber of variable volumetric capacity, and is equipped with a piston valve of special design, to control the compression pressure, the ignition pressure, and to retard the combustion, thereby distributing the high ignition pressures from the immediate neighborhood of the dead center crank position, over a greater percentage of the piston stroke, away from the dead center, thereby delaying the point of expansion, and also gaining a considerable amount of power and torque, as the diagram, Figs. 1 and 2, plainly show. Due to the peculiar design of the combustion chamber extension, and the piston valve operating in it, complete turbulence and combustion will be possible, causing an improvement in the thermal efficiency, with the result that a great range of supercharging the engine is possible. In Figs. 1–2 the travel or stroke of the piston of an internal combustion engine is shown on horizontal lines 0–100, in percentages of the piston displacement, so that when the piston has uncovered one half, or 50% of the piston displacement, the position of the piston in Figs. 1 and 2 will be at 50 of horizontal lines 0–100 of the chart. Also shown on the horizontal lines 0–100 of Figs. 1 and 2 are the volumes of the combustion chambers in percentages of the piston displacement, OY and ON for the constant volume and OX and OS for the variable volume combustion chamber. In Fig. 1 the full line diagram A, B, C, D, E, F, A, shows the operating process of the present day two-cycle diesel engine. In this diagram, A indicates the piston position and pressure at which fresh air is taken into the cylinder. At B the air supply stops, and at C the exhaust closes and compression of the air enclosed in the cylinder begins, until maximum compression pressure is reached at D. By this time the temperature of the compressed air is about 1000° F., sufficient to ignite the fuel oil injected shortly before the point D is reached. The ignition will raise the pressure to a maximum at E, of the diagram. Due to the fact that the combustion chamber is of constant volume between the cylinder head and the piston top, and indicated in Fig. 1 by line YO, the expansion of the combustion gases in the cylinder will start immediately after ignition stops at E in Fig. 1. The combustion gases will now expand along line EF, with the exhaust opening at F, soon to be followed by the opening of air inlet, admitting a fresh air supply into the cylinder to repeat the cycle. As the diagram in Fig. 1 plainly shows, the characteristics of the present day diesel engine is the heavy concentration of ignition pressures in the immediate neighborhood of the crankshaft dead center position, along the line DE, causing heavy stresses in the cylinder and housing. It is one of the features of this invention, to relieve the severe pressure and stress conditions, by the use of a combustion chamber of variable volumetric capacity, indicated by line XO Fig. 1, representing a maximum volume of about double capacity of volume YO. The effect of the greater combustion chamber volume, will be the maintenance of the compression pressure and temperature at D, and the ignition pressure at E. However, due to the special design and use of a piston valve in the extended combustion chamber, the ignition of the fuel oil will be spread over a greater portion of the piston stroke to a point ES, Fig. 1, and the expansion of the combustion gases will be along the line ES—FS, Fig. 1. At FS the exhaust valve opens to release the combustion gases, while fresh air is admitted along the line AS—BS, scavenging and charging the cylinder with fresh air of greater pressure than in the case of the present day engine. This is necessary in order to maintain the compression pressure which should be just high enough to insure the ignition of the fuel oil. In this invention the operating cycle of a two-cycle diesel engine takes place along dotted lines AS BS CS D E ES FS AS of Fig. 1. The gain in power with this invention is determined by the difference in area of that circumscribed by the dotted lines AS BS CS D E ES FS AS and that circumscribed by the full lines A B C D E F A. In the case of Fig. 1, the area circumscribed by the dotted line is about double the area circumscribed by the full lines, consequently, double the horsepower will be produced with this invention than with the present day conventional engine.

In Fig. 2 an indicator diagram in full lines shows the operating process of the present day four cycle diesel engine, while an indicator diagram in dotted lines shows the operating process of a four-cycle diesel engine embodying this invention. The same considerations apply to Fig. 2 as explained for Fig. 1, the difference being in the number of ignitions during the same time, which is one ignition during four piston strokes in the four cycle, and two ignitions during four strokes in the two cycle engine. In the four cycle engine one complete piston stroke each is available for exhaust and air intake, while in the two-cycle engine exhaust and air intake take place at the end of the expansion and the beginning of the compression stroke. Due to these conditions the four cycle engine has only about half the capacity than the two cycle engine when running with the same speed.

In Fig. 3 the numeral 10 designates the cylinder of a two-cycle diesel engine. A piston 11 reciprocates in the cylinder, transmitting power through connecting rod 12, which is connected with piston 11, and the crank of a crankshaft 13, the latter being mounted for rotation in suitable bearings 14. A gear 15 is connected to crankshaft 13 to rotate with it, and this gear 15 transmits rotary motion through idlers 16, supported in bearings 16a, to a gear 17 fastened to a shaft 18, that is mounted in suitable bearings 19. A cam 20 is carried by shaft 18, and this cam engages a roller 21, to operate a fuel injection pump 22, and which latter is of a well known construction.

Fuel oil is supplied through pipe 23, to the pump 22, where the oil is put under pressure and transmitted through a pipe 24, to an injection nozzle 25, to be forced into and burned in the combustion chamber which is formed by the cylinder 10, piston 11, the cylinder head 26 and the combustion chamber extension 27.

A piston valve 28 is movably arranged in the extension 27 of the combustion chamber so that the volumetric capacity in the combustion chamber through the medium of this extension may be varied at will.

Rigidly connected with the piston valve 28 is a rod 29 that is in turn connected with a lever 30 that is carried by a rocker shaft 31, which latter is mounted for oscillating motion in suitable bearings 32. Rocker shaft 31 receives its rocking motion through a piston rod 34 that is rigidly connected to a piston 35 reciprocating in a cylinder 36.

Piston 35 may be operated in any suitable manner such as by steam, compressed air, hydraulic or any other fluid pressure, that may be admitted, to or released from the cylinder 36, through ports 39 and 40, depending upon the position of a piston valve 38, which latter operates in a valve box 36a.

The piston valve 38 is connected to a rod 38a, which in turn is pivotally connected to a bell crank 41 that is pivoted at 41a. Bell crank 41 receives a rocking motion, due to the upward or downward motion of governor weights 46, caused by an increase or decrease of the speed of the engine which is transmitted to the governor weights 46 by shaft 18 through meshing gears 49, vertical shaft 48, and links 47 and 47a.

The movement of the governor weights 46 again is transmitted through lower links 47a and a sleeve 45, to the lever 43 which is pivoted at 44. Thus, the upward or downward motion of the governor weights 46 is directly transmitted to the piston valve 38 in the valve box 36a.

Numeral 50 designates an air compressor cylinder, in which a piston 51 reciprocates, atmospheric air being admitted through an inlet valve 52, in the cylinder head 53. An outlet valve 54 is also disposed in the cylinder head, and operates to release the compressed air to be supplied to the cylinder 10, through a pipe 55, whenever the piston 11 uncovers an opening 56 near the bottom of cylinder 10.

The valve 52 is opened automatically by atmospheric pressure, and will remain open as long as the atmospheric pressure exceeds the pressure in the cylinder. However, in order to prevent the valve 52 from closing entirely on the compression or discharge stroke of the piston 51, so as to control the amount of air taken into the cylinder 50, the lever 57 is provided, and arranged so that one end thereof will engage and hold the valve from closing entirely.

Inlet valve 52 will admit atmospheric air to the cylinder 50, and will keep this air to be compressed in cylinder 50 as long as it is allowed to move freely to open or close the valve seat in cylinder head 53, due to the position of a control lever 57, as shown in Fig. 5. With the control lever 57, however, in a position as shown in Fig. 4 inlet valve 52 will not return to its seat in cylinder head 53, and the air taken into the cylinder 50 will again return into the atmosphere, and consequently the piston 51 will not deliver any air to cylinder 10. Between the two extremes of the full capacity and no delivery of air the amount of air for delivery to cylinder 10 can be regulated by proper adjustment of the position and movement of control lever 57.

The adjustment for the desired position, and movement of control lever 57 may be accomplished by moving a tapered cam 58, longitudinal on the shaft 18 with which shaft the tapered cam 58 rotates (see Figs. 18 to 21). The longitudinal movement of the cam 58, is effected by a lever 62, which in turn receives its motion through a shaft 63, mounted in a bearing 64, and also by the lever 65. Both levers 62 and 65 are rigidly connected to the shaft 63. Lever 65 is connected with piston rod 34, and will move whenever piston 35 in cylinder 36 is actuated upon by pressure fluid admitted to or release from cylinder 36, by piston valve 38, which in turn is under the control of governor weights 46. Thus the control lever 57 determines the action of inlet valve 52, and the air compressor cylinder 50, furnishes the required amount of air necessary for any existing load condition.

The cam 58 preferably embodies a cylindrical section 67 of comparatively large diameter on one end, and on the other a cylindrical section of comparatively small diameter 66 with a tapered section in between connecting the cylindrical sections 66 and 67. The tapered section of cam 58 consists of two cam portions 58a and 58b. The portion 58a is arranged in a straight line parallel to the axis of shaft 18 and causes lever 57 to move downwardly in accordance with the showing in Figs. 4 and 4a at the same predetermined point for any position of cam 58 on the shaft 18 in relation to the cam roller 59. The cam portion 58b is a spiral cam and causes lever 57 to move upwardly as shown in Figs. 5 and 5a at various locations of the roller 59 on the cam portion 58b. The spiral cam portion 58b starts on the cylindrical surface 66 at about 180° ahead of the straight line cam portion 58a, and then joins the straight line cam portion 58a on the cylindrical surface 67. Both cylindrical surfaces 66 and 67 are concentric to the axis of shaft 18, and for this reason the lever 57 will remain either in its upward or downward position when the roller 59 is riding on the surface 66 or 67 respectively, as shown in Figs. 5 and 4.

Figure 18:
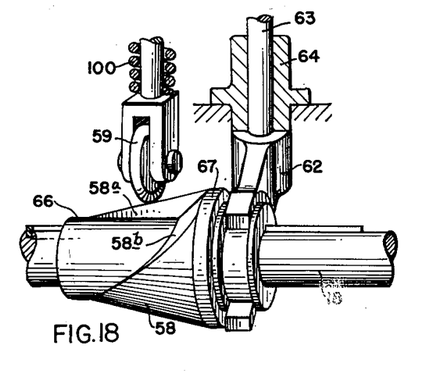
Fig. 18 is an enlarged perspective view of the cam member shown in Fig. 3, and showing the cam follower in an intermediate position between the ends of the cam.
Figure 19:
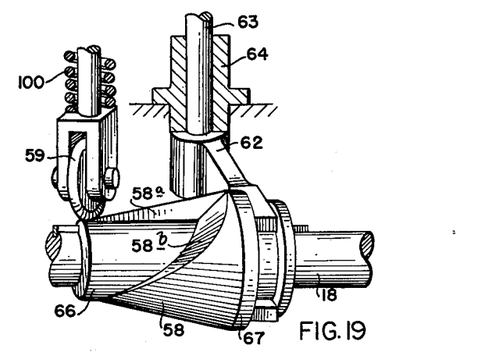
Fig. 19 is a view of the cam similar to Fig. 18, but showing the cam follower at the small end of the cam.
Figure 20:
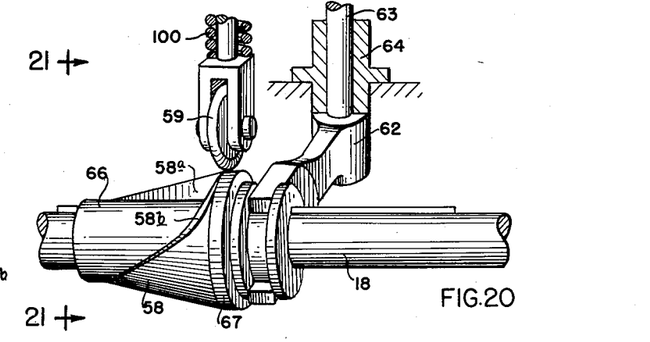
Fig. 20 is a view similar to Fig. 18, but showing the cam follower at the large end of the cam.

Figs. 18, 19 and 20 show the cam 58, roller 59 and shaft 18 on an enlarged scale, and wherein the roller 59 is in three different positions relative to the cam 58 for three different positions of the cam 58 on shaft 18. Fig. 18 shows the numeral 59 in substantially the longitudinal center of cam 58 causing the lever 57 to remain in a downward position to hold the flexible valve 52 open during part of the discharge stroke of the compressor piston, until after the lever is forced downwardly by means such as a spring 100 on the cylindrical surface 66 after rotation of the cam 58 in the direction indicated by the arrow in Fig. 21.

Fig. 19 shows roller 59 engaging the concentric surface 66 which positions the lever 57 upwardly in accordance with Figs. 5 and 5a. Lever 57 does not move when the roller is on this portion of the cam, whereupon the valve 52 is allowed to act automatically according to the differences in pressure below or above the valve 52. This means that the compressor piston 51 in Fig. 3 will furnish the maximum compressed air volume to power cylinder 10.

Figure 4A:
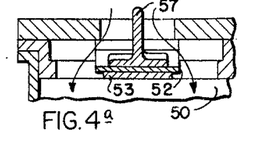
Fig. 4a is a fragmentary vertical sectional view along the line 4a—4a of Fig. 4.
Figure 5A:
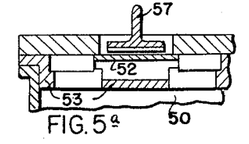
Fig. 5a is a fragmentary vertical sectional view along the line 5a—5a of Fig. 5.
Figure 21:
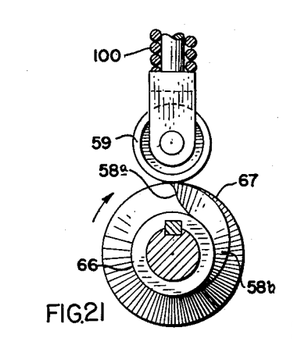
Fig. 21 is a vertical sectional view along the line 21—21 of Fig. 20, and showing the cam in end elevation.

Figs. 20 and 21 show the roller 59 engaging the concentric cylindrical surface 67, whereby the lever 57 will be positioned downwardly as shown in Figs. 4 and 4a. Again, no motion of the lever 57 will take place, and the flexible valve 52 will remain downwardly against the bottom of cylinder cover 53 as long as roller 59 is riding on surface 67. In this case the atmospheric air will go into the compressor cylinder 50 and out again with no discharge of compressed air into the power cylinder 10.

As is well known in the art, fuel oil injection pump 22, is provided with a rack 68, for adjusting pump 22, for minimum and maximum fuel oil delivery to injection nozzle 25, to comply with variable load requirements. Rack 68 is operated by lever 70 pivoted at 69. Rod 71 is connected to lever 70 and 72, which latter is rigidly connected to shaft 31. Thus it will be seen that any movement of rocker shaft 31, is simultaneously transmitted to piston valve 28, control lever 57, and rack 68 of fuel oil pump 22. This construction, as shown in detail in Fig. 3, will therefore permit the accomplishment of the objects of this invention disclosed in the charts shown in Figs. 1 and 2.

While in Figs. 1 through 5, the theoretical principles of this invention are shown, Figs. 6 through 16 show the practical application of some of the details to be used. While these details may differ from each other in their construction for accomplishing the objects of this invention, it is to be understood that any modification in the details will in no way subtract from the merits of this invention.

In Fig. 6 the piston valve 28a in the combustion chamber extension 27a is of somewhat different design, and is operated by a handwheel 73, fastened to a threaded spindle 74. By turning handwheel 73 in one or the other direction the piston valve 28a will move either in or out and thereby decrease or increase the volumetric capacity of the combustion chamber extension. It is well known in the art how the spindle 74 may be connected to shaft 18 in Fig. 3, so as to simultaneously control fuel oil pump 22 and control lever 57 of air compressor cylinder 50, whenever it is desired to move piston valve 28a in combustion chamber extension 27a.

Figures 7, 8:
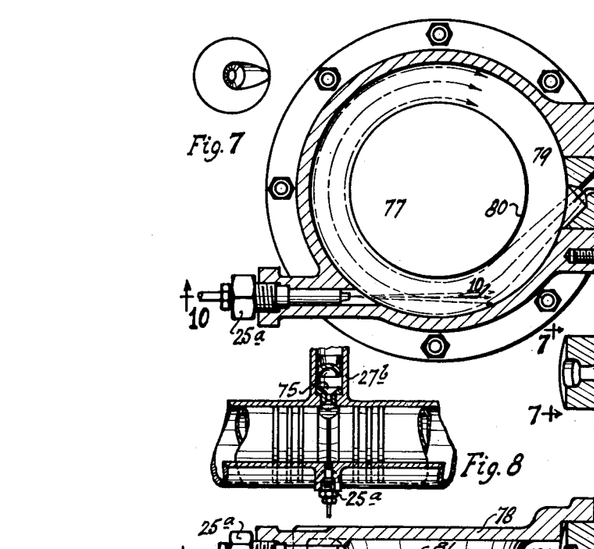
Fig. 7 is an end view on lines 7—7 of Fig. 6.
Fig. 8 is a longitudinal sectional view on a reduced scale through the combustion chamber, of a portion of an opposed piston internal combustion engine embodying this invention.

Fig. 8 shows the application of this invention in an opposed piston engine with a combustion chamber extension 27b being provided with an insert or filler 75, for improved turbulence and combustion.

Figures 9, 11, 13:
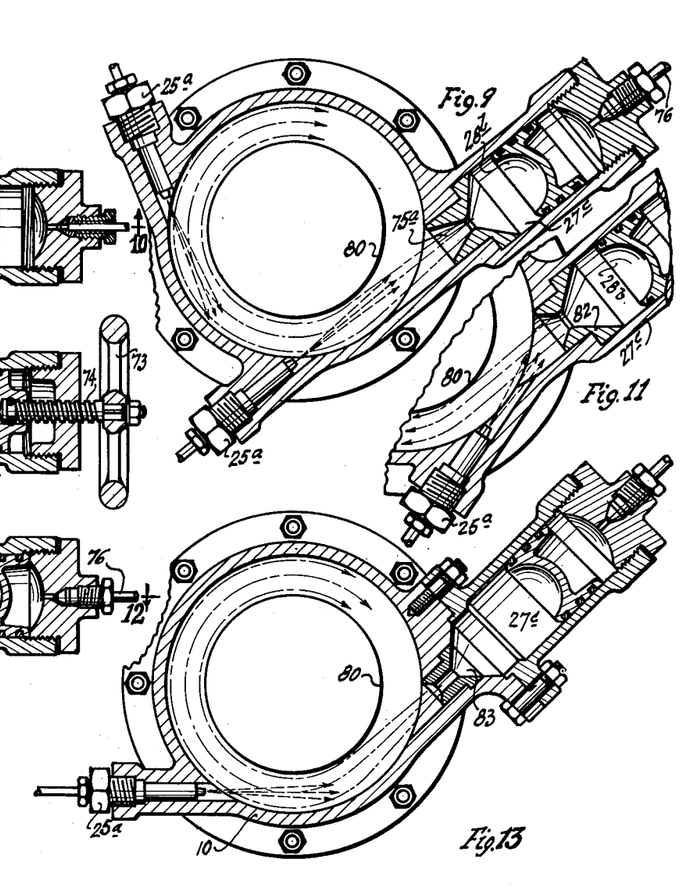
Fig. 9 is a cross sectional view through the cylinder and variable combustion chamber, with injection nozzles arranged for turbulence.
Fig. 11 is a detail sectional view of the cylinder and variable combustion chamber, with an insert, and injection nozzle arranged for turbulence.
Fig. 13 is a horizontal sectional view through the cylinder and variable combustion chamber, with an insert and injection nozzle arranged for maximum turbulence.

In Fig. 9 the combustion chamber extension 27c is provided with an insert 75a and two fuel injection nozzles 25a arranged for improved turbulence and combustion. The piston valve 28b is operated by fluid pressure through pipe 76. In Figs. 10 and 12 the numerals 80 and 81 designate respectively projections on piston 77 and cylinder head 78 so as to form an annular space to force the combustion gases towards the cylinder wall, see Fig. 12, and thus cause an effective turbulence for better and complete combustion.

In Fig. 11 a somewhat different type of insert 82 is shown and also injection nozzles 25a is shown in closer proximity of insert 83 causing a turbulence somewhat different from that shown in Figs. 9 and 12.

While in Figs. 9 and 11 the greater part of the fuel oil will enter the combustion chamber extension 27c, in Fig. 13 the relative position of the injection nozzle 25a and insert 83 is such that most of the injected fuel oil will be burned in the cylinder, due to the fact that the injected fuel oil hits the compressed air coming out of the combustion chamber extension 27c through the insert 83, tangentially, quite a distance away from the insert 83.

Figure 14:
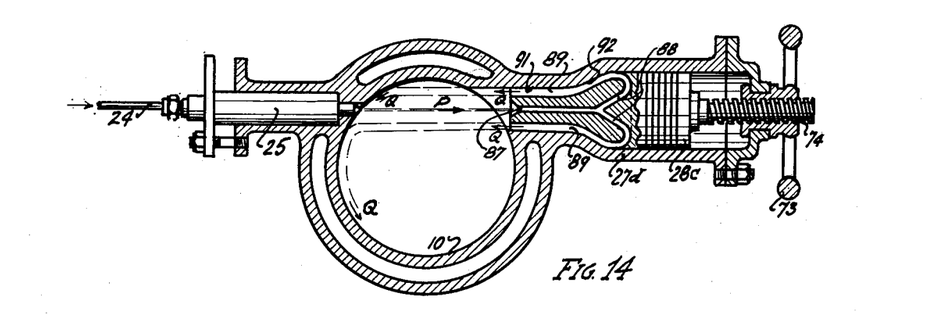
Fig. 14 is a horizontal sectional view through the cylinder and variable combustion chamber, with injection nozzle and piston valve in the variable combustion chamber, arranged for complete combustion and turbulence.

In Fig. 14 the numeral 27d designates a combustion chamber extension for variable volumetric capacity, in which extension a piston valve 28c can be moved in or out preferably by handwheel 73, and spindle 74. While the movement of piston valve 28c in Fig. 14 is done manually, it can also be moved by fluid pressure, as in Fig. 3, or electrically, and it is to be understood that the mode of operating the piston valve in no way detracts from the merits of the invention. Piston valve 28c in Fig. 16 has three distinct surfaces 84, 85 and 86, of which 84 is a cylindrical part serving as a guide for piston valve 28c when moving in or out. Cylindrical surface 84 may be provided with piston rings 93, which prevent high pressure gases from passing between cylindrical surface 84 and the inner cylindrical surface of combustion chamber extension 27d.

Figure 16:
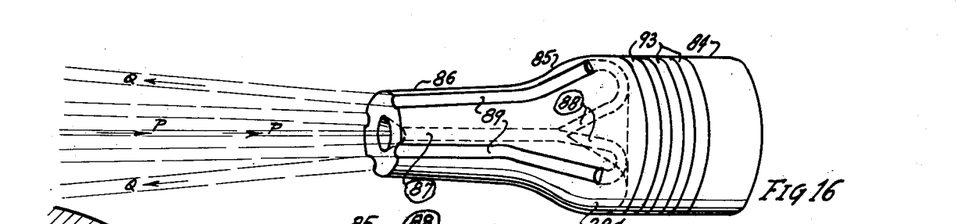
Fig. 16 is an enlarged perspective view of the piston valve shown in Fig. 14.

Piston valve 28c has further a conical part 85, which will fit on the inner conical part 92 of combustion chamber extension 27d. A tapered section 86 of piston valve 28c is adapted to fit tightly in a corresponding inner tapered section 91 of combustion chamber extension 27d when this valve 28c is moved all the way in.

Figure 15:
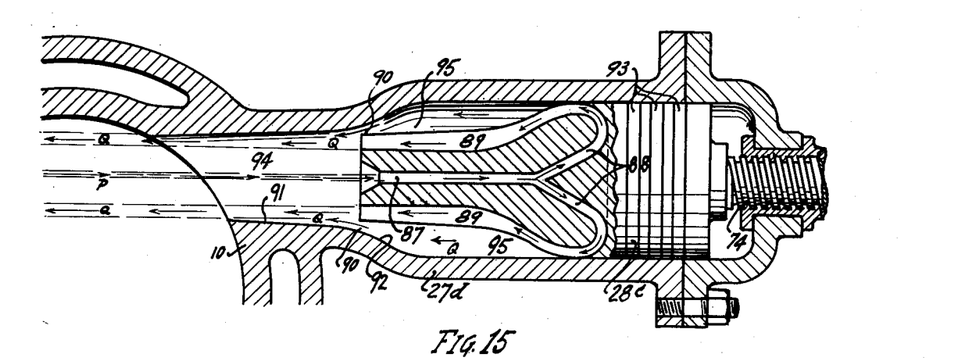
Fig. 15 is an enlarged sectional view of the variable combustion chamber and piston valve shown in Fig. 14.
Figure 17:
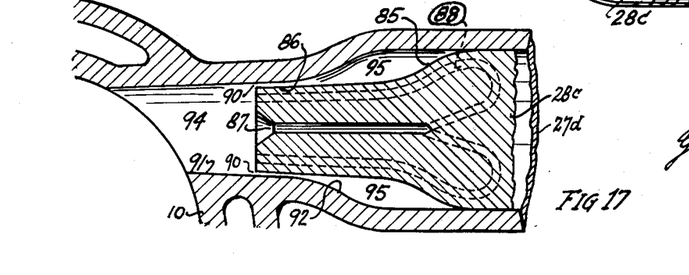
Fig. 17 shows parts of Fig. 15 with sections broken away and piston valve turned 45°.

When piston valve 28c in Figs. 15 and 17 moves in a direction away from the cylinder 10, then the conical part 85 and the tapered part 86 of the piston valve 28c will move away from their respective seats at 92 and 91, and thus form an enlarged combustion chamber space 94 in front of piston valve 28c, and also another enlarged space 95 back of the space 94 and which spaces are connected with each other through an annular space 90.

Piston valve 28c is provided with a central opening 87 through which fuel oil from the injection nozzle passes in the direction of arrow P (Fig. 15). This opening 87 branches out into side passages 88 within the valve which connect with grooves or passages 89 on the outer portions 85 and 86 of the surface of piston valve 28c, as shown in Figs. 14, 15 and 16. The direction P of the incoming fuel oil is reversed into the direction Q by passing through side passages 88, and grooves or passages 89 back into the cylinder 10.

In Fig. 17 piston valve 28c is in about a midway position of the two extreme positions shown in Figs. 14 and 15. The annular connecting passage 90 with spaces 94 and 95 in Fig. 17 is particularly important.

It is thought that the operation of this improved type of engine will be clearly understood from the foregoing description, but, briefly stated, it is as follows:

As is well known, diesel engines depend for ignition of their fuel oil upon high temperatures raised by the compression of atmospheric air, and in case of solid injection, heat generated by the piercing of the highly compressed air, by the fuel oil jets, will contribute greatly to the rise of temperature for ignition.

It is also well known that diesel engines of the two-cycle type require an air compressor for furnishing air for combustion. In case of supercharging both two-cycle and four-cycle engines necessitate air compressors for larger volumes and higher pressures.

For the sake of explanation it is assumed that in Fig. 3 the engine is running under normal load and with a constant normal speed, forcing the governor weights 46 into their middle position, between the extreme upper and extreme lower position. In this midway position of governor weights 46, the piston valve 38, the piston 35, levers 30—33—43—57—62—65—70—72 and bell crank 41 are all in their middle position and air and fuel oil supply are set for this normal load.

If now a heavier load is thrown on the engine, then the engine will have a tendency to slow down in speed and the governor weights 46 will assume a lower position, since the centrifugal force compelling the governor weights to fly out and up, or in and down pulling sleeve 45 with it, depends on the speed of the engine. The downward movement of sleeve 45 is transmitted through lever 43, rod 42, bell crank 41 and rod 38a to piston valve 38, moving it to the left. Piston valve 38 will admit fluid pressure behind piston 35 from the right and move piston 35 to the left. This left-hand movement of piston 35 will be transmitted through lever 33, shaft 31, lever 30 and rod 29 to piston valve 28 in combustion chamber extension 27, and also to fuel oil control rack 68 through lever 70, rod 71 and lever 72. At the same time piston 35 will move cam 58 on camshaft 18 toward the right, and cam 58, through roller 59 and rod 60, will move control lever 57 into a position to allow cylinder 50 to furnish a greater amount of compressed air necessary for the greater amount of fuel oil to be burned, to deliver a larger amount of horsepower for the heavier load.

In case now a lighter load is thrown on the engine then the engine will have a tendency to run with greater speed, and this will cause the governor weights 46 to go out and up, moving sleeve 45 with it. This movement of sleeve 45 will cause all the different levers, rods, piston valves, piston, control levers to move in the opposite direction to the one described in the preceding paragraph, and therefore a smaller amount of compressed air and fuel oil will be furnished to the engine, corresponding to the lighter horsepower requirements of the smaller load.

As has been explained, a further object of the invention in conjunction with the economical power control of the engine is the application of a specially designed piston valve 28c, illustrated more in detail in Fig. 16 and described above. This piston valve is adapted to be brought into different positions, so as to change the required combustion chamber volumetric capacity for different loads on the engine.

In Fig. 14 piston valve 28c is in the extreme inner position and fuel oil is injected in the direction of the arrows P through center passage 87. In side passages 88 the fuel oil, now mixed with combustion gases and compressed air, reverses its direction in the direction of the arrows Q, flows through passages 89 back into cylinder 10. In Fig. 14 piston valve 28c is tightly seated against surfaces 91 and 92, of combustion chamber extension 27d. Due to the properties of tapered and conical surface an annular space 90 will be established, connecting spaces 94 and 95 as soon as piston valve 28c moves away from its extreme inner position, see Fig. 14, towards its extreme outer position, see Figs. 15 and 17. The fuel oil and combustion gases will now not only flow through passages 89, but, also through annular space 90, see Figs. 15 and 17.

As the piston valve 28c approaches its extreme outer position, see Fig. 15, the size of the space 94 and that of the space 95, are increasing until they reach their maximum volume shown in Fig. 15. The effect of the cooperation of center passage 87, side passages 88, passages 89, spaces 94 and 95 and annular space 90 is to retard combustion from E to ES in Fig. 1 and from K to KS in Fig. 2, as is the object of this invention in order to produce the greatest amount of horsepower, turbulence, complete combustion and economy per cylinder unit. The air compressor necessarily must be designed for this greatest horsepower output. For small power requirements control lever 57 will automatically regulate, as described above, the right amount of air needed for the combustion of smaller amount of fuel oil.

Figure 22:
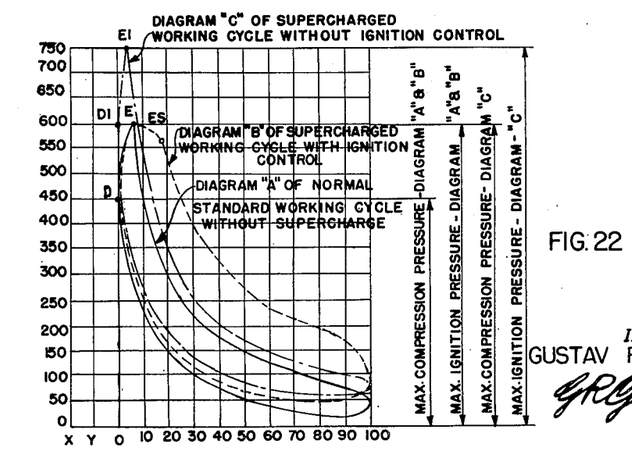
Fig. 22 is a diagrammatic representation similar to Figs. 1 and 2, showing the ignition and combustion period for normal load in full lines, a supercharged load in accordance with the present state of the art in dot-and-dash lines, and a supercharged load according to the present invention in dotted lines.

Referring now for the moment to Fig. 22, this figure illustrates the ignition and combustion period diagrammatically similarly to Figs. 1 and 2. Normal load is shown in full lines. A supercharged load in accordance with the present status of the art is shown in dot-and-dash lines, and a supercharged load in accordance with the present invention is shown in dotted lines. For the normal load the compression pressure is 450 pounds per square inch as shown at D, and the combustion pressure is 600 pounds per square inch as at E. With a supercharge and a constant combustion, the compression pressure will rise to 600 pounds per square inch as at DI, and the combustion pressure will accordingly go to about 750 pounds per square inch, and perhaps higher as at EI. This indicates that very high pressures occur either directly in the dead center position of the power piston or only a very short distance away from it. Since in this position, the entire force is directed in a straight line, through the center of the crank shaft, no tangential force for rotating the crank shaft is available. This detrimental condition is avoided and overcome by the present invention by prolonging and extending the combustion a distance away from the dead center as shown at ES. By this method the high pressures of the combustion will contribute materially to the tangential force rotating the crank shaft, and will increase the actual horsepower to a greater extent than the present supercharging method, as shown by the dot-and-dash lines.

There are other devices with which supercharging is possible. For instance, a design permitting the valve 52 to be kept open during a fraction of the discharge stroke of air piston 51, so that a portion of the incoming air is being returned to the atmosphere again, by using a cam shaft having adjustable eccentric bearings.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. An internal combustion engine embodying a cylinder, a piston reciprocable therein, means for supplying air to said cylinder to be compressed therein, means for injecting fuel oil into said compressed air to be ignited for combustion thereby, means controlled by the speed of the engine for automatically varying the size of the combustion space in said cylinder, the last said means including a chamber having communication with the combustion space in the cylinder, a piston valve having a projection thereon and operable in the chamber and through which piston valve the incoming fuel flows, and passages in the projection of said piston valve for reversing the direction of flow of the fuel back into the main cylinder.

2. An internal combustion engine embodying a cylinder, a piston reciprocable therein, means for supplying air to said cylinder to be compressed therein, means for injecting fuel oil into said compressed air to be ignited for combustion thereby, means controlled by the speed of the engine for automatically varying the size of the combustion space in said cylinder, the last said means including a chamber having communication with the combustion space in the cylinder, a piston valve having a projection thereon and operable in the chamber and through which piston valve the incoming fuel flows, passages in the projection of said piston valve for reversing the direction of flow of the fuel back into the main cylinder, and means operating the valve in timed relation with the said fuel injecting means.

3. An internal combustion engine embodying a cylinder, a piston reciprocable therein, means for supplying air to said cylinder to be compressed therein, means for injecting fuel oil into said compressed air to be ignited for combustion thereby, means controlled by the speed of the engine for automatically varying the size of the combustion space in said cylinder, the last said means embodying a chamber having communication with the combustion space in the cylinder, a piston valve having a projection thereon and operable in the chamber and through which valve the incoming fuel flows, passages in the projection of said piston valve for reversing the direction of flow of the fuel back into the main cylinder, and manual means for adjusting and setting the said valve.

4. The method of controlling the power requirements of an internal combustion engine, which consists in providing a combustion chamber of variable volumetric capacity, supplying a fuel oil to said chamber and reversing the flow of said fuel oil in the chamber, admitting a supply of compressed air into the combustion chamber, controlling the amount of compressed air thus admitted, retarding and controlling the time required for combustion, to avoid sudden explosions and to increase the power output of the engine, and controlling the air and fuel supply, commensurate with the variable volumes of the combustion chamber, according to the different power requirements.

5. The method of supercharging, controlling and regulating the power requirements of an internal combustion engine, which consists in providing a combustion chamber of variable volumetric capacity, supplying a fuel oil to said chamber and reversing the flow of said fuel oil in the chamber, admitting a supply of compressed air into the chamber sufficient for maximum supercharge, retarding and controlling the time required for combustion, to avoid sudden explosions and to increase the power output of the engine, and controlling the amount of compressed air and fuel supply, commensurate with the variable volumes of the combustion chamber, according to the different power requirements.

6. An internal combustion engine comprising a cylinder, a piston reciprocable therein, means for supplying air under pressure to said cylinder to be compressed therein, means for injecting fuel oil into said compressed air to be ignited for combustion thereby, an auxiliary chamber communicating with the combustion space in said cylinder and having tapered side walls, a piston valve in said chamber having tapered sides conforming to the taper of said chamber walls, means for moving said piston valve in said chamber to vary the size of the combustion space, and a passage between the piston valve and the wall of said chamber when said piston valve is moved to enlarge the combustion space for controlling the ignition pressure in the cylinder.

7. An internal combustion engine comprising a cylinder, a piston reciprocable therein, means for supplying air under pressure to said cylinder to be compressed therein, means for injecting fuel oil into said compressed air to be ignited for combustion thereby, a chamber communicating with the combustion space in said cylinder, a piston valve in said chamber adapted to be moved therein toward said cylinder to close the chamber or away from said cylinder to enlarge the combustion space, an inlet passage through said piston valve to receive the injected fuel oil, a plurality of return passages in said piston valve communicating with the outlet end of said inlet passage and terminating adjacent the inlet end of said inlet passage, whereby the fuel oil will be dispersed and returned to said combustion space, and means to move said piston valve in said chamber.

8. An internal combustion engine comprising a cylinder, a piston reciprocable therein, means for supplying air under pressure to said cylinder to be compressed therein, means for injecting fuel oil into said compressed air to be ignited for combustion thereby, a chamber having a cylindrical bore communicating with the combustion space in said cylinder, the wall of said chamber having a slight taper outwardly for a distance and then flared outwardly at a greater taper to provide a valve seat, a valve movable in said chamber and being shaped to conform to the tapers of said chamber wall, whereby movement of said valve against said seat will close the chamber, and movement of said valve away from said seat will establish communication between said chamber and the combustion space in said cylinder, an inlet passage in said valve to receive the injected fuel oil, outlet passages in said valve communicating with said inlet passage and directing the fuel to the space between said valve and the wall of said chamber, thereby to retard ignition of the fuel, and means to move said valve in said chamber.

9. An internal combustion engine comprising a cylinder, a piston reciprocable therein, means for supplying air under pressure to said cylinder to be compressed therein, a precombustion chamber communicating with said cylinder, means for injecting fuel oil through said cylinder and into said chamber, a piston valve in said chamber movable to vary the size of the combustion space, an inlet passage through said piston valve to receive the injected fuel, and a groove along the surface of said piston valve communicating with said inlet passage to return the fuel to said chamber and retard the ignition thereof.

GUSTAV R. GEHRANDT.

(References on following page)

REFERENCES CITED

The following references are of record in the file of this patent:

UNITED STATES PATENTS

| Number | Name | Date |
|---|---|---|
| 622,798 | Fagerstrom | Apr. 11, 1899 |
| 2,001,535 | Lang | May 14, 1935 |
| 2,005,858 | Hinkley | June 25, 1935 |
| 2,036,253 | Bremser | Apr. 7, 1936 |
| 2,054,562 | Haag | Sept. 15, 1936 |
| 2,067,611 | Loeffler | Jan. 12, 1937 |
| 2,085,199 | Loeffler | June 29, 1937 |
| 2,114,924 | Kahllenberger | Apr. 19, 1938 |
| 2,281,685 | Fischer | May 5, 1942 |
| 2,346,458 | Sanders | Apr. 11, 1944 |
| 2,384,282 | Chandler | Sept. 4, 1945 |

FOREIGN PATENTS

| Number | Country | Date |
|---|---|---|
| 122,382 | Austria | 1931 |